United States Patent [19]

Thompson et al.

[11] Patent Number: 5,499,241
[45] Date of Patent: Mar. 12, 1996

[54] BROADBAND COMMUNICATIONS SYSTEM

[75] Inventors: Leo J. Thompson, Lilburn; Gregory T. Dubberly, Atlanta; John A. Ritchie, Jr., Duluth, all of Ga.; David M. Fellows, Beverly, Mass.

[73] Assignee: Scientific-Atlanta, Inc., Norcross, Ga.

[21] Appl. No.: 123,363

[22] Filed: Sep. 17, 1993

[51] Int. Cl.⁶ ...................................................... H04H 1/08
[52] U.S. Cl. ............................. 370/73; 370/110.1; 348/6; 455/3.1
[58] Field of Search ..................... 370/69.1, 73, 71; 455/4–6, 3.1, 74; 348/12, 13, 11, 8, 6, 14, 15, 16; 379/64; 375/7, 8

[56] References Cited

U.S. PATENT DOCUMENTS

| | | | |
|---|---|---|---|
| 2,236,501 | 4/1941 | Goldsmith . | |
| 3,275,746 | 9/1966 | Beltrami . | |
| 3,529,088 | 9/1970 | Hauer | 370/76 |
| 3,992,589 | 11/1976 | Kuegler | 370/120 |
| 4,099,202 | 7/1978 | Cavanaugh | 358/85 |
| 4,367,548 | 1/1983 | Cotten, Jr. et al. | 358/86 |
| 4,485,400 | 11/1984 | Lemelson et al. | 358/85 |
| 4,534,024 | 8/1985 | Maxemchuk et al. | 370/94.1 |
| 4,633,462 | 12/1986 | Stifle et al. | 455/5 |
| 4,709,418 | 11/1987 | Fox et al. | 455/612 |
| 4,748,618 | 5/1988 | Brown et al. | 370/94.1 |
| 4,761,684 | 8/1988 | Clark et al. . | |
| 4,763,317 | 8/1988 | Lehman et al. | 370/60 |
| 4,849,811 | 7/1989 | Kleinerman | 358/133 |
| 4,887,158 | 12/1989 | Guichard et al. | 358/143 |
| 4,888,638 | 12/1989 | Bohn | 358/84 |
| 4,888,795 | 12/1989 | Ando et al. | 379/53 |
| 4,891,694 | 1/1990 | Way | 358/86 |
| 4,905,080 | 2/1990 | Watanabe et al. | 358/84 |
| 4,907,079 | 3/1990 | Turner | 358/84 |
| 4,912,552 | 3/1990 | Allison, III et al. | 358/84 |
| 4,920,533 | 5/1990 | Dufresne et al. | 455/5.1 |
| 4,926,255 | 5/1990 | Von Kohorn | 358/84 |
| 4,937,821 | 6/1990 | Boulton | 370/69.1 |
| 4,955,048 | 8/1990 | Iwamura et al. | 379/53 |
| 4,961,109 | 10/1990 | Tanaka | 358/84 |

(List continued on next page.)

FOREIGN PATENT DOCUMENTS

WO90/13956 11/1990 WIPO .

OTHER PUBLICATIONS

A Passive Optical/Coax Hybrid Network Architecture for Delivery of CATV, Telephony and Data Services; by M. Mesiya, pp. 358–364, 1993.

Primary Examiner—Douglas W. Olms
Assistant Examiner—Ajit Patel
Attorney, Agent, or Firm—Jones & Askew

[57] ABSTRACT

A broadband communications system for coupling telephony or other digital networks to a CTV network. The system includes transmitting a multiplex of telephony signals in 3 MHz channels in the forward band of the CTV network. Each 3 MHz channel is QPR modulated on a carrier and contains multiple subscriber telephony signals. The forward telephony channels are demodulated and demultiplexed by a plurality of subscriber terminals into the individual telephony signals directed to an addressed subscriber. The individually addressed telephony signal is then applied to a line card which connects the subscriber telephone equipment to the system. Audio and control signals returning from the subscriber are digitized into standard telephony signals and modulated on a carrier in 50 kHz reserved telephony channels onto the reverse band of the CTV network. The multiplicity of reverse band telephony channels are demodulated and multiplexed into a standard telephony signal which can be directly interfaced to the telephony network. In the illustrated embodiment, the CTV network has a fiber to the serving area architecture that can be used to increase the number of reverse band channels which are available to the broadband communications system. Several configurations for the system are described where the input and output interface can both be coupled at the headend or both coupled at a fiber node, or either one coupled at the headend while the other is coupled at a fiber node.

32 Claims, 6 Drawing Sheets

U.S. PATENT DOCUMENTS

| | | | |
|---|---|---|---|
| 4,974,252 | 11/1990 | Osborne | 379/92 |
| 4,975,902 | 12/1990 | Damany | 370/62 |
| 4,995,071 | 2/1991 | Weber et al. | 379/53 |
| 5,003,384 | 3/1991 | Durden et al. | 358/84 |
| 5,008,926 | 4/1991 | Misholi | 379/89 |
| 5,014,125 | 5/1991 | Pocock et al. | 358/85 |
| 5,027,426 | 6/1991 | Chiocca, Jr. | 455/5.1 |
| 5,029,333 | 7/1991 | Graves et al. | 370/58.1 |
| 5,063,587 | 11/1991 | Semasa et al. | 379/53 |
| 5,075,771 | 12/1991 | Hashimoto | 358/84 |
| 5,084,903 | 1/1992 | McNamara et al. | 375/18 |
| 5,088,111 | 2/1992 | McNamara et al. | 375/18 |
| 5,124,980 | 6/1992 | Maki | 370/77 |
| 5,136,575 | 8/1992 | Kuroda | 370/30 |

BROADBAND COMMUNICATIONS SYSTEM

FIELD OF THE INVENTION

The system pertains generally to broadband communications systems, such as cable television (CTV) networks, and is more particularly directed to communicating telephony signals, and other or similar digital signals, over CTV and equivalent networks.

BACKGROUND OF THE INVENTION

CTV network architectures for NTSC systems in the United States are fairly well established. Multiple system operators (MSOs) have networks which pass approximately 90% of the population with approximately 60–65% of the households actually being connected. These networks in the future will be upgraded to have more information carrying capacity and to better provide an increasing number of subscriber services.

In general, present CTV networks are broadband communications networks of coaxial cable and optical fiber which carry a plurality of 6 MHz amplitude modulated video channels on a frequency division multiplexed basis. The bandwidth of the typical CTV system is from 50 MHz to 550 MHz, which could increase in the future to over 1 GHz when increased amounts of optical fiber are used. CTV networks are very advantageous for providing a broadband communications path from a single point (headend) to multiple distribution points (subscribers), but are substantially limited in their return path. One reason is that the component equipment of such networks, which include amplifiers and compensation networks, are adapted to pass only for forward spectrum frequencies. Another reason is the noise which propagates in the reverse band of a single point to multiple point distribution system such as a CTV network. Because in the reverse direction the CTV network appears as an inverted tree, noise is propagated from every distribution point back to a single point, the headend. All of the individual noise contributions collectively add together to produce a very noisy environment and a communications problem at the headend.

In the past, it has not been considered advantageous that CTV networks could be used for telephony signals, which are low bandwidth voice signals that require point to point distribution and simultaneous bi-directional communication. Modern telephone networks, on the other hand, while limited in bandwidth do have the switching capability to provide point to point communications.

The advent of pay-per-view services, interactive television applications, and the business of providing various data services to subscribers has brought about a change in thinking about CTV networks. While not every MSO has an installed system which provides for two way communications, most cable television equipment has recently been designed to allow for limited upstream transmissions (in the direction from the subscriber to the headend).

Practically all modern CTV networks provide a so-called split or two-way system having one spectrum of frequencies for downstream or forward transmissions, which typically is from over 50 MHz to 550 MHz, and a second spectrum for upstream or reverse transmissions, which includes at least a band from approximately 5 MHz to 30 MHz. Generally, this reverse band comprises cable television channels T7 (5.75–11.75 MHz), T8 (11.75–17.75 MHz), T9 (17.75–23.75 MHz), and T10 (23.75–29.75 MHz). These return path channels, each having a 6 MHz television channel bandwidth, may be used for a variety of purposes.

Whether the CTV system is a so-called "sub-split", "mid-split", or "high-split" system, the two way transmissions in all three types of split transmission systems typically involve upstream transmissions at least in the 5–30 MHz band. The carriage of telephone signals should be able to take into account this limited bandwidth in the reverse direction of typical cable systems so as to not disturb the considerable investment MSOs have already made in their networks or to require extensive rebuilds to provide additional telephone service.

Another problem encountered with carrying telephony signals over the CTV networks is that there can be up to several hundred thousand subscribers served from a single headend. The bandwidth required for this number of subscribers for telephony service could make it too expensive to add to an operating CTV network because of its displacement of other revenue producing services. Therefore, there needs to be an advantageous method of limiting the bandwidth of telephony service on CTV networks before such services can become a reality.

Some CTV networks have recently developed an advantageous architecture which allows for the muse of limited frequency ranges for specialized groups of subscribers. These networks, having what is termed a "fiber to the serving area" (FTSA) architecture, contemplate dividing the subscriber base of a CTV network into manageable serving areas of approximately 400–2500 subscribers. Each serving area is coupled in a star configuration to the headend of a CTV network by an optical communications path ending in a fiber node. The fiber node acts as the distribution point of a high quality broadband CTV signal which is subsequently connected to the serving area subscribers over a coaxial cable distribution sub-network of feeders and drops in each serving area. The broadband signal in the forward direction is identical for each serving area to provide the same subscriber service to all customers in the subscriber base. In the reverse direction, it envisions an independent spectrum of frequencies associated with the particular serving area which can be used for different purposes, or many times for the same purpose.

The FTSA architecture provides the advantage of multiplying the bandwidth of the reverse portions of the spectrum times the number of serving areas. These portions of the broadband spectrum of the system not used in the forward direction, including the T7-T10 channels in the reverse band, are essentially spaced division multiplexed, and different auxiliary services can be provided to each serving area.

A final problem in the carriage of telephony signals over a CTV network is the interface between the telephony network and the CTV network. CTV networks are essentially local area networks which receive program feeds by satellite or by optical links and are thus limited to a small geographic areas. To be useful in the carriage of telephony signals, a CTV network should be able to seamlessly interface to a telephony network at a point where it is commercially viable to carry such signals. It must also provide signals which can pass to other parts of the interconnected telephone systems without extensive modulation or protocol changes to thereby become part of the international telephone system.

SUMMARY OF THE INVENTION

The invention includes an apparatus and a method for providing broadband communications, including bidirectional telephony communications, to a multiplicity of CTV network subscribers.

In one embodiment, the method includes communicating telephony signals from a telephony network to the CTV subscribers in the forward band of the CTV network and communicating the telephony signals from the CTV subscribers to the telephony network in the reverse band of the CTV network.

In another preferred embodiment, the method includes the digitizing of individual subscriber telephony signals into a multiplexed signal that is carded on a frequency division multiplexed carrier in the forward band of the cable network. The digital multiplexed signal is quadrature partial response (QPR) modulated on a carrier which is positioned in an otherwise unused portion of the CTV network forward band. In the illustrated embodiment, the QPR signal is preferably 3 MHz in bandwidth in order to fit in the 1.5 MHz guard bands between adjacent CTV channels. In another preferred embodiment, a pair of the QPR signals can be placed in an otherwise unused channel in the CTV line to utilize 6 MHz of bandwidth. By making a system which uses use a robust digital signal, the bandwidth of the forward CTV band can be efficiently allocated. The system operator can plan and change these allocations on a flexible basis as new services are made available or old services are taken off line.

In a preferred embodiment, the subscriber telephony signals to the telephony network are digitized and individually modulated on a carrier in the reverse band of the CTV system. As an illustrated example, each subscriber telephony signal is QPSK modulated into a 50 kHz bandwidth signal and frequency division multiplexed on the reverse band of the CTV network. The individual telephony signals are multiplexed into a standard TDM telephony signal which can be adapted to couple directly into a SONET port or other standard telephony connection such as a DS1, DS2, or DS3 format signal, of the telephony network.

By using the reverse band of the CTV network in small increments of 50 kHz, the flexibility of the reverse signaling band is not compromised. The system operator can still provide interactive TV services, PPV services and other reverse path signals while providing telephony service.

The number of subscribers served by the telephony service can be increased several fold if the CTV network is a FTSA network. The space division multiplexing of the reverse band makes it economical to provide all subscribers in a serving area with a telephony service. If a serving area contains 500 subscribers, then the bandwidth needed for a dual path system at 50 kHz per subscriber would be 25 MHz, within the 5–30 MHz reverse band of the most prevalent split band systems.

BRIEF DESCRIPTION OF THE DRAWINGS

These and other objects, features and aspects of the invention will be better understood and more fully described if a reading of the following detailed description is undertaken in conjunction with the appended drawings wherein.

DETAILED DESCRIPTION OF THE PREFERRED EMBODIMENTS

Figure 1:
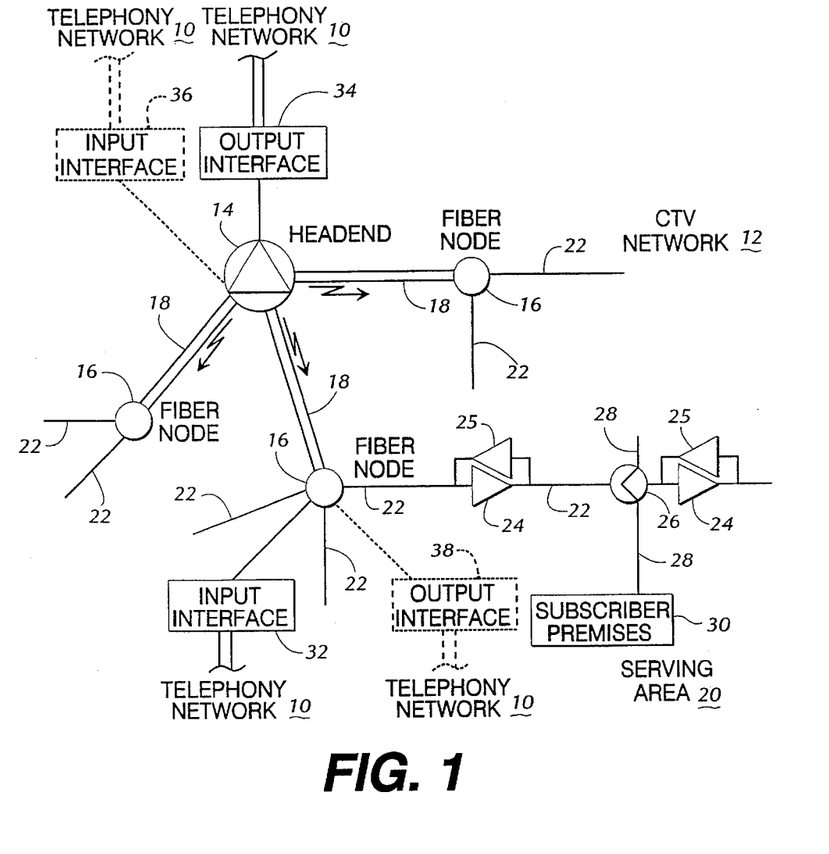
FIG. 1 is a system block diagram of a broadband telephony system constructed in accordance with the invention.

With respect now to FIG. 1, there is shown a broadband communications system constructed in accordance with the invention. The system will be described in connection with the communications of telephony signals, but it will be evident that other signals of similar or equivalent types can also be used. Further, while digital telephony signals are described, the system is also capable of communicating analog telephony signals or other types of digital signals. Telephony signals from the telephony network are coupled to the CTV network 12 and are communicated over the CTV network to an addressed subscriber premises 30. The addressed subscriber 30 communicates telephony signals back over the CTV network 12 which are then coupled to the telephony network 10. The system serves as an extension of the telephony network 10 where subscribers can call out to the telephony network 10 or receive calls from the telephony network. This service is in addition to the conventional video, audio, data and other services provided to each subscriber by the CTV network 12.

A preferred implementation of the broadband communications system is illustrated in FIG. 1. The system includes the telephony network 10 which interfaces through an input interface 32 to the CTV network 12. The CTV network 12 further interfaces with the telephony network 10 through an output interface 34. Telephony signals are communicated to subscribers of the CTV network 12 through the input interface 32 to a subscriber premises 30. Telephony signals from the subscriber premises 30 of the CTV network 12 are communicated over the CTV network 12 and through the output interface 34 to the telephony network 10. The broadband communications system does no switching and thus takes advantage of the strength of the CTV network 12 for its broadband communications path and the strength of the telephony network 10 for its connection and switching capability.

The CTV network 12 is illustrated as having a fiber to the serving area (FTSA) architecture. A headend 14 provides CTV programming which is distributed via a distribution network to a plurality of subscribers at their subscriber premises 30. The distribution network serves groups of subscribers, from 400–2500, which are located proximately in serving areas, such as the one referenced 20. The headend 14 is coupled to each serving area in a star configuration through an optical fiber 18 which ends in a fiber node 16. The CTV programming and telephony signals are converted from an RF broadband signal to light modulation at the headend 14, transmitted over the optical fiber 18, and then converted back to an RF broadband signal at the fiber node 16. Radiating from each of the fiber nodes 16 throughout its serving area 20 is a coaxial sub-network of feeders 22 having bidirectional amplifiers 24 and line extenders 25 for boosting the signal.

The RF broadband signal is distributed to each of the subscriber premises 30 by tapping a portion of the signal from the nearest feeder 22 with a tap 26, which is then connected to the subscriber premises through a standard coaxial cable drop 28. The CTV network thus provides a broadband communications path from the headend 14 to each of the subscriber premises 30, which can number in the several hundreds of thousands.

While one preferred embodiment of the invention shows the input interface 32 coupled to the fiber node 16 and the output interface 34 coupled to the headend 14, it is evident that the insertion and extraction of the RF telephony signals need not be limited to this single architecture. Both the input interface 32 and an output interface 38 (shown in phantom) can be connected at the fiber node 16. Alternatively, both an input interface 36 (shown in phantom) and the output interface 34 can be coupled to the headend 14. Moreover, the input interface 36 can be coupled to the headend 14, while the output interface 38 can be coupled to the fiber node 16. For cable architectures which do not conform to a star configuration, it is generally most advantageous to insert the RF telephony signals at the headend and to extract them from the system at the headend. Each architecture has its own distinct advantages as will be more fully described hereinafter.

The input and output interfaces produce a facile method for inserting the telephony signals in one direction and extracting the telephony signals in the other. The telephony signals are transformed into compatible RF signals which can be inserted or extracted from the CTV network 12 in much the same manner as other programming at various points in the network. The compatibility of RF telephony signals with the previous RF signals on the network 12 allows their transmission in a transparent manner over the network without interference to the other signals or special provision for their carriage.

Theoretically, the broadband communications path provided by the CTV network 12 is bidirectional so that information can be passed in each direction. However, because of convention and the single point to multipoint nature of most networks, the reverse path, i.e., communications originating from the subscriber premises 30 and communicated to the headend 14, is much more limited. Normally, the reverse amplifiers 25 are bandwidth limited and include diplexers which separate the CTV spectrum into forward and reverse paths based on frequency.

Figure 2:
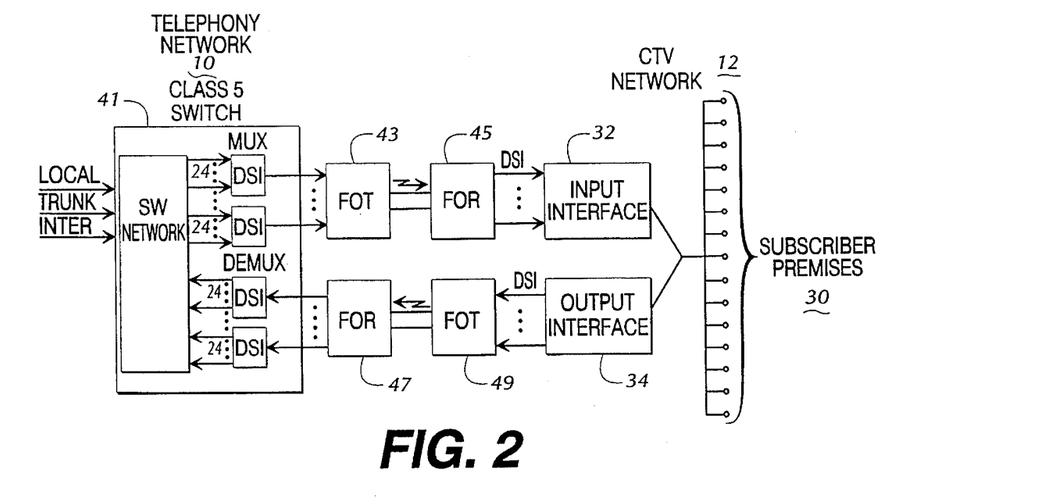
FIG. 2 is a system block diagram of one embodiment of the broadband communications system illustrated in FIG. 1 connected to a telephony network.

FIG. 2 illustrates a preferred implementation of the broadband communication system configured as an extension to a telephony network. For connection to the telephony network 10, a class 5 switch 41 is used. The switch 41 has suitable circuitry for handling conventional local, trunk and interconnect signals which integrate the switch into the local area, national and international calling grids. The switch 41 has a switching network of crosspoints which may switch any of a plurality of inputs to any plurality of outputs. Particularly, the switch 41 has equipment for providing the digitizing of outgoing calls into a DS0 type format which are concatenated in multiplexers into DS1 format signals. Additionally, the switch 41 has means for demultiplexing DS1 signals into a plurality of DS0 signals which then can be routed to outgoing points. The system uses a forward path which receives a plurality of the DS1 channels at the input interface 32 and connects them over the CTV network 12 to the subscriber premises 30. The subscriber premises 30 transmit telephony signals over the CTV network 12 to the output interface 34 which converts them back into the same number of DS1 signal channels for transmission to the switch 41. If the switch 41 is located proximately to the input interface 32 and the output interface 34, then they can be coupled directly. Alternatively, as will be the most prevalent case, where a headend or fiber node is not located proximately to the class 5 switch, an optical fiber link can be used to connect the switch 41 and interfaces 32 and 34.

In the forward direction, a fiber optic transmitter 43 converts the plurality of DS1 telephony signals into an optical signal which is transmitted to a fiber optic receiver 45. The fiber optic receiver 45 converts the optical signal back into the DS1 format telephony signals. Likewise, the fiber optic transmitter 49 in the reverse path converts the outgoing DS1 telephony signals into an optical signal which is received by the fiber optic receiver 47 for conversion back into the DS1 telephony format signals.

The DS1 telephony signal format was chosen because it is a standard telephony format, and conventional optical links to do the conversion and transmission are readily available for the transmitters 43, 49 and for the optical receivers 45, 47.

The system uses this bidirectional mode of communication where each DS1 signal contains 24 DS0 channels, which can be considered groups of 64 kb/s digital data channels. The 64 kb/s channels can either be used for voice, data, audio (music, stored information), etc. In general, for telephony type signals, each DS0 channel is addressed to a particular subscriber in the forward path and has a corresponding DS0 channel assigned to that subscriber in the reverse path. This permits the switch 41 to connect any of the local, trunk or interconnect calling points to any of the DS0 channels in the forward path and its associated DS0 channel in the reverse path to the same local, trunk or interconnect points for completing the communications path. Each of the subscribers 30 appears as another DS0 subscriber connected directly to the class 5 switch 41. The distribution system of the CTV network 12 is transparent to the switch 41 and does not need any further communication, information or connection to the broadband communication system.

Figure 3A:
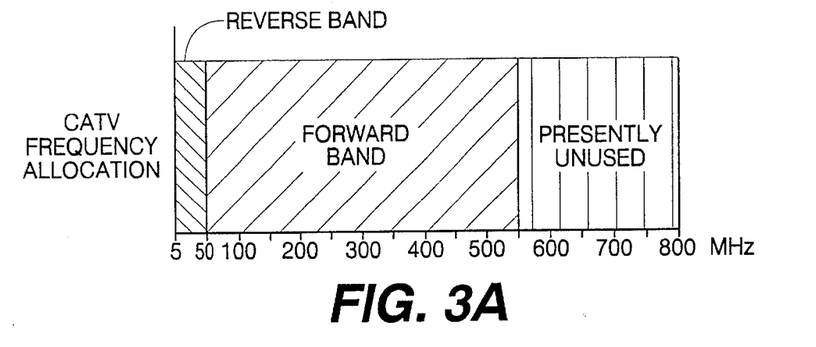
FIG. 3A is a pictorial representation of the frequency allocation of typical split CTV systems illustrating their forward and reverse signaling bands.

FIG. 3A illustrates a typical frequency allocation for many of the installed split band CTV networks. The frequencies used for programming which generate the revenues for the system operator are carried in the forward band from 50 MHz to about 550 MHz. Although, the frequencies above 550 MHz are not presently used, there has been increased interest in providing additional services in this unused forward bandwidth, currently considered to extend to about 1 GHz. Conventionally, the forward band comprises a series of video channels, each 6 MHz in bandwidth, which are frequency division multiplexed across the forward band. Several areas are not used and each video channel has a 1.5 MHz guard band between other adjacent channels.

In combination with the forward band, the typical CTV spectrum includes a reverse band from about 5–30 MHz. These frequencies have been allocated for signals returning from the subscriber to the headend. This band has traditionally been relatively narrow because of the high noise from the funneling effects of the multiplicity of the multipoint signals adding to a single point. Further, in the past bandwidth taken from the forward band has meant less revenues from other services. The present invention provides a solution to these problems by providing a system where the telephony signals to a subscriber premises are communicated in the forward band of the spectrum and the telephony signals from a subscriber premises are communicated in the reverse band of the CTV system.

Figure 3B:
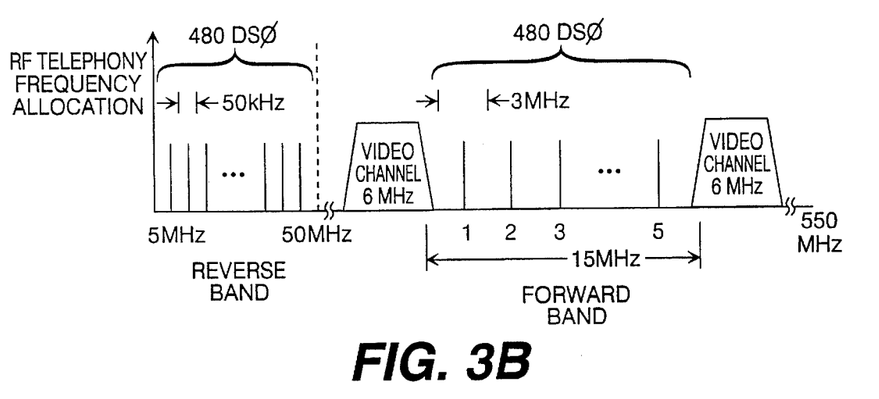
FIG. 3B is a pictorial representation of the frequency allocation of the broadband communications system illustrated in FIG. 2.

As seen in FIG. 3B, the broadband communications system utilizes a plurality of frequency division multiplexed carriers in the forward band to communicate the telephony signals to the subscribers. In the illustrated embodiment, five channels of approximately 3 MHz are used to carry incoming telephony signals from the telephony network 10. Each forward channel is a QPR modulated carder, where the modulation occurs as a 6.312 Mb/s digital data stream, specifically in a DS2 telephony signal format including four DS1 telephony signals. The carriage capacity of such a system is then 20 DS1 channels, or enough for 480 DS0 voice channels.

Each of the reverse band signals are 50 kHz in bandwidth, which is narrow enough to be easily placed at different frequency division multiplexed positions in the frequency spectrum. The modulators are frequency agile and can reallocate frequencies based upon traffic over the system, noise, channel condition, and time of use. The 50 kHz wide carders can be placed anywhere in the reverse band that there is space for them. Depending upon the CTV system, i.e., whether there is a reverse amplification path in the distribution network, they could also be allocated to frequencies normally reserved for forward band transmissions. Further, such system is expandable by bandwidth for other uses besides the individual telephony signals. For example, if a particular subscriber required a return path of a greater bandwidth than the 50 kHz, then the bandwidth could be easily allocated to this use without a complete reconfiguration of the system. Such uses may include high speed data transmissions, trunk connections for small central offices, video services originating from the telephony network, and other uses requiring a nonstandard bandwidth.

There are a number of advantages with the broadband communications system as described. It uses the reverse band efficiently and uses only that portion of the forward band which is necessary. Digital QPR and QPSK modulation is used to permit digital and telephony services to the subscriber and provide a robust signaling method allowing the forward or reverse signals to be placed anywhere in the CTV band, either at high or low frequencies without signal to noise ratio concerns. Moreover, in the forward direction, the carder signals are minimized so that carder overloading does not occur and that the 3 MHz channels can be placed where space is found.

Figure 4:
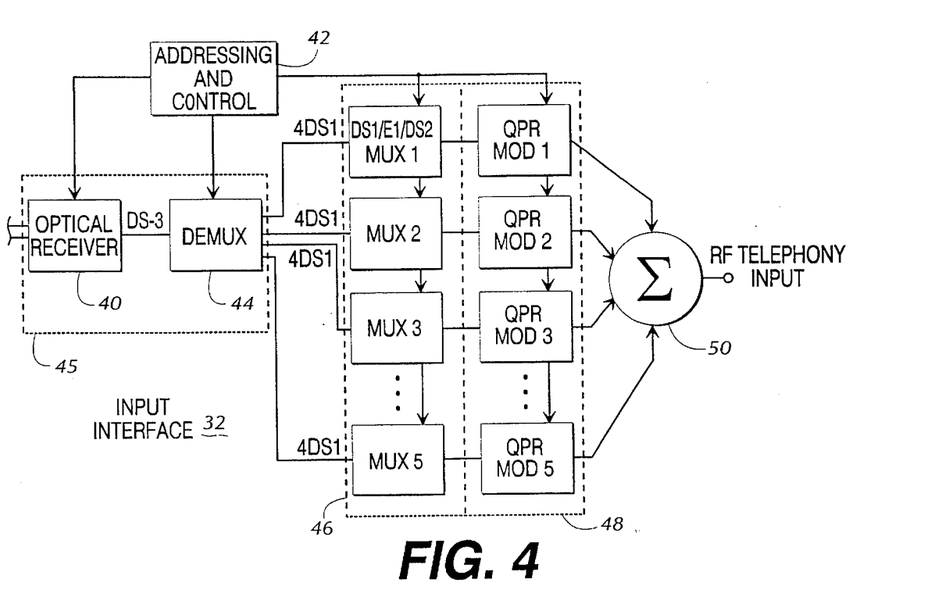
FIG. 4 is a detailed block diagram of the telephony network to the CTV network input interface of the system illustrated in FIG. 2.

A detailed block diagram of the input interface 32 is illustrated in FIG. 4. The function of the input interface 32 is to convert the 20 DS1 telephony signals into the five QPR modulated RF signals which are sent to the subscribers in the forward band of the CTV system 12. The input interface 32 comprises an optical receiver 40 for converting the optical signal into an RF digital signal of a standard telephony format. The optical receiver provides for the light signal to RF signal conversion and further allows an addressing and control unit 42 to decode and strip overhead and framing bits from the signal. A demultiplexer 44 receives the digital DS3 telephony signal and separates it into its 28 component DS1 signals, where each DS1 signal comprises 24 DS0 signals. Next, a series of five multiplexers 46, each take four of the DS1 signals from the demultiplexer 44 and combine them with signaling and addressing bits from the addressing and control unit 42 to form a 6.312 Mb/sec serial digital signal. Each of the five digital signals is modulated on a selected carrier frequency by an associated QPR modulator 48. The five telephony channels from the outputs of the modulators 48 are frequency division multiplexed together in an RF combiner 50 before being inserted conventionally on the CTV network 12.

Figure 5:
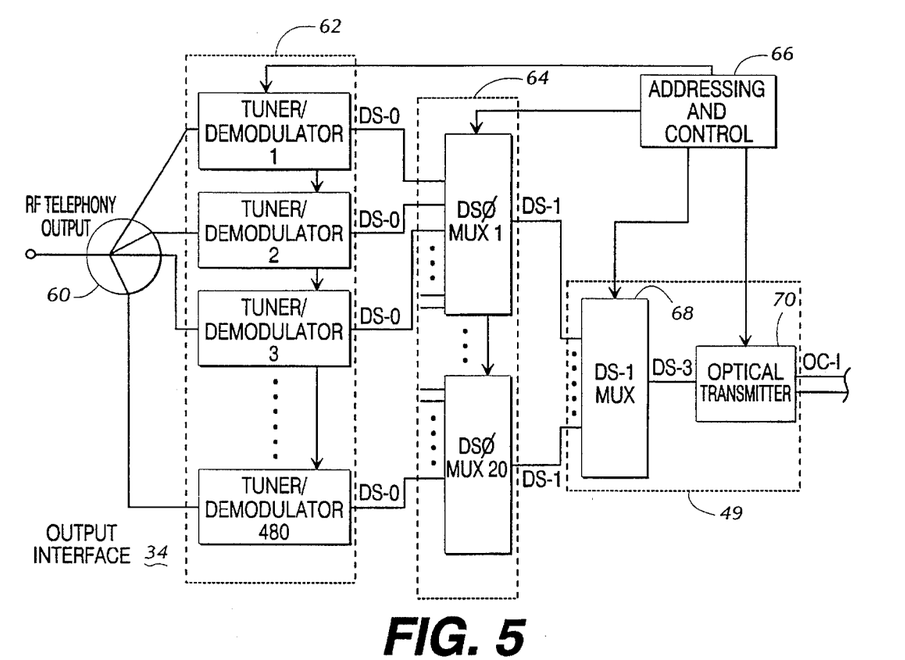
FIG. 5 is a detailed block diagram of the telephony network to the CTV network output interface of the system illustrated in FIG. 2.

The output interface 34 will now be more fully described with reference to FIG. 5. The output interface 34 functions to convert the 480 DS0 digital signals which are QPSK modulated on the reverse band carriers into the optical format for coupling to the telephony network 10. The output interface 34 extracts the reverse band signals in a conventional manner and fans them out with a signal divider 60 to a plurality of tuner/demodulators 62. Each of the tuner/demodulators 62 is adapted to tune one of the carrier frequencies of the reverse band signals and demodulate it into a DS0 format digital signal. The tuners of the tuner/demodulators 62 can be variable or fixed, or can be adapted to tune only certain bands of the reverse spectrum. The output of the tuner/demodulators 62 is 480 DS0 signals which are concentrated into groups of DS1 signals by a group of multiplexers 64 under the control of addressing and control unit 66. Each of the multiplexers 64 inputs 24 DS0 formatted signals and outputs one DS1 formatted signal. The 20 DS1 signals are concentrated in a similar manner by a multiplexer 68 which outputs a single digital signal to the optical transmitter 70. The addressing and control unit 66 adds the necessary control information in the optical transmitter 70 before communicating the digital DS1 signals in an optical format. The optical transmitter 70 also converts the RF signal into light so the optical fiber of the telephony network can transmit it.

Figure 6:
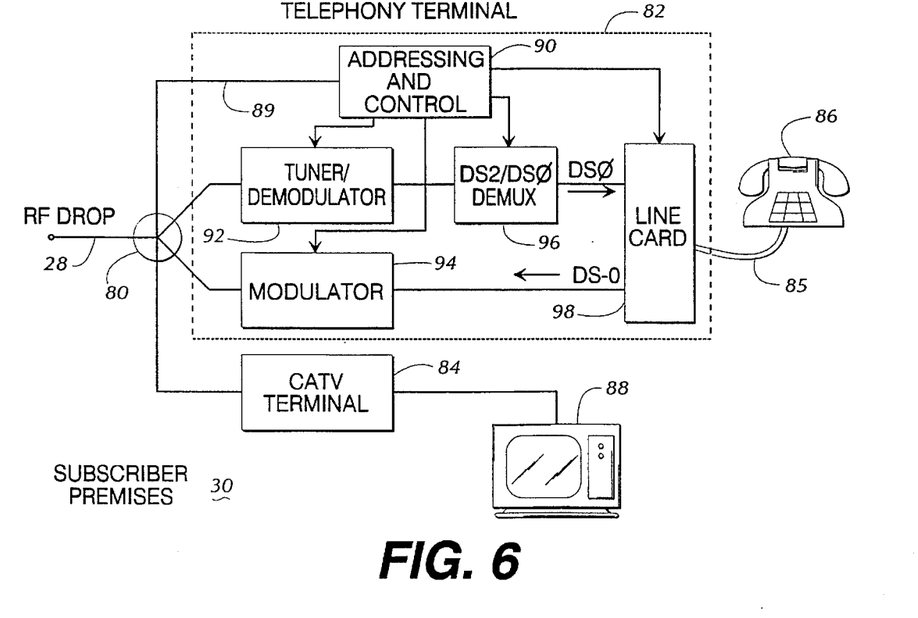
FIG. 6 is a detailed block diagram of a telephony terminal for receiving telephony signals from the telephony network through the CTV network and for transmitting telephony signals to the telephony network through the CTV network.

A detailed block diagram of the system equipment at the subscriber premises 30 is shown in FIG. 6. Generally, the subscriber will want to maintain CTV video or other services and has a CTV terminal 84 for this purpose connected between the CTV drop line 28 and a television receiver 88. The CTV terminal is connected to a splitter/combiner/diplexer 80 coupled to the drop 28 from one of the CTV coaxial subnetwork feeders. Because the presently described broadband communications system does not interfere with or displace the conventional CTV programming and frequency allocations, the CTV terminal 84 can be used with no modification or change in operation of the installed terminal base. The system operator does not need to change or reconfigure its distribution network operation and the new telephone service is compatible with its installed CTV subscriber terminal base.

The broadband communications service is provided by coupling a telephony terminal 82 between the splitter/combiner/diplexer 80 and the telephone equipment 86. The telephony terminal 82 converts the incoming telephony signals to a subscriber into analog signals which can be used by a standard telephone handset 86 over a pair of twisted wires 85. Further, the telephony terminal 82 converts the analog signals, representing outgoing telephony signals from the handset 86, into a QPSK modulation which is coupled to the CTV network. A standard telephone handset 86 is shown for the purpose of illustration but could in fact be any equipment normally connected to a telephone line for digital communications purposes.

The telephony terminal 82 has two communication paths. The first path for incoming signals comprising a tuner/demodulator 92, demultiplexer 96, and a portion of a line card 98 and a second path for outgoing signals including a portion of the line card 98 and a modulator 94. The tuner/demodulator 92, modulator 94, demultiplexer 96, and line card 98 are under the control of an addressing and control unit 90.

For incoming telephony signals which are received in the 3 MHz channels modulated on an FDM carrier, the control unit 90 causes the tuner/demodulator 92 to tune the carrier on which the particular call information directed to the subscriber is carried. The carrier defines one of the five 3 MHz channels having 4 DS1 or 3 E-1 telephony signals QPR modulated thereon.

The telephony signals are demodulated by the tuner/demodulator 92 into a serial digital stream containing the 4 DS1 or 3 E-1 telephony signals before being input to the demultiplexer 96. The demultiplexer 96 selects the particular DS0 digital telephony channel assigned to the subscriber at the input rate of 64 kb/s and inputs the data to an input terminal of the line card 98. The control unit 90 determines which forward telephony channel to tune and which DS0 signal to select from that channel from the signal and addressing information it receives by its connection to the splitter/combiner/diplexer 80 via line 89.

The DS0 digital format provides a voice channel with sufficient bandwidth for voice quality communications. The DS0 format is a 64 kb/s data stream of bytes forming timed samples of an analog voice signal. This produces a voice signal quantized to 8-bits per sample (256 values) at a sampling rate of 8 kHz and with a bandwidth of 4 kHz.

The line card 98 receives the digital telephony signal in the DS0 format and converts it to the proper analog voltages and signals to drive the telephone handset 86. In addition, the line card 98 provides ringing current, terminal identification, and other standard functions under the direction of control unit 90. The line card 98 receives the analog telephony signals from the telephone handset 86 and converts them into a digital DS0 format. Dialing signals and other addressing and control signals from the handset 86 are also digitized by the line card 98. The digitized outgoing telephone signals are then combined and formatted by the line card 98 into a DS0 format at 64 kb/s and input to the modulator 94.

The modulator 94 under the regulation of the control unit 90 selects a carrier frequency in the reverse band and QPSK modulates the DS0 telephone signal thereon. The QPSK modulated carrier having a bandwidth of approximately 50 kHz is coupled on the CTV network through the splitter/combiner/diplexer 80.

Figure 7A:
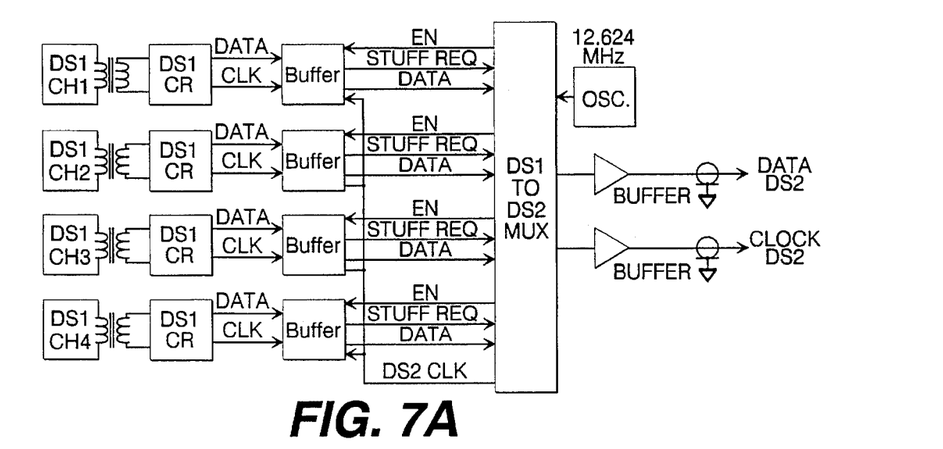
FIGS. 7A and 7B are detailed block diagrams of the DS1 to DS2 multiplexer of the input interface illustrated in FIG. 4.
Figure 7B:
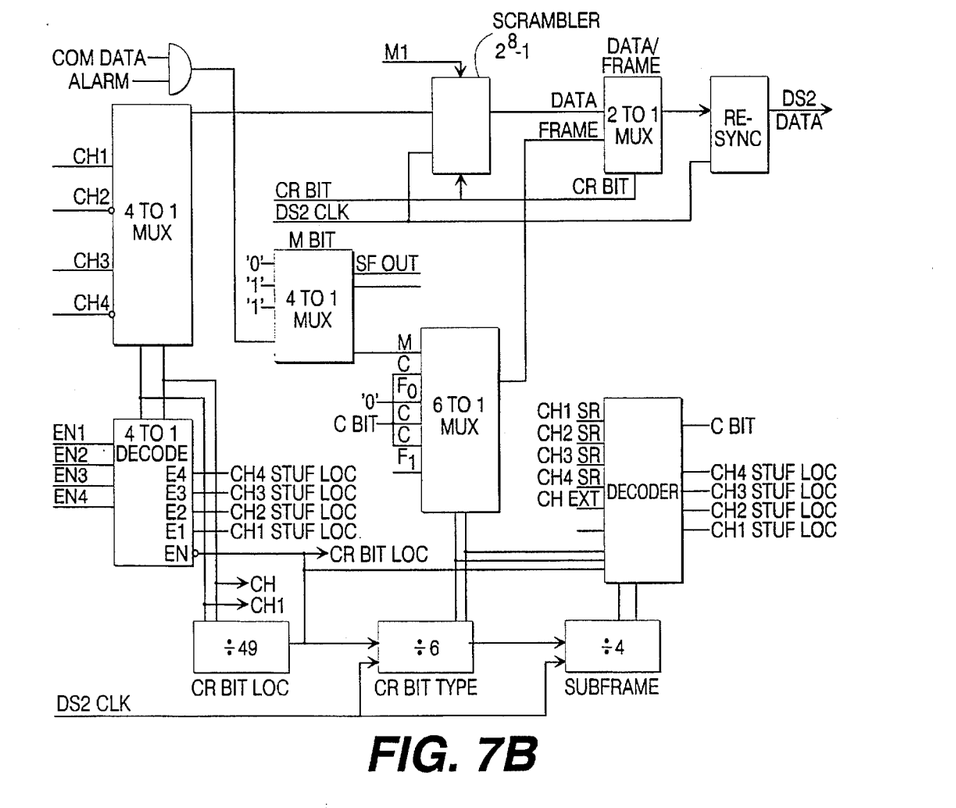

FIGS. 7A and 7B illustrate a derailed block diagram of the conversion means for converting 4 DS1 digital format signals into a DS2 digital format signal. Each of the DS1 signals, if delivered by a standard telephony optical receiver, will be at analog voltages and differentially for transmission over a subscriber loop. This signal is transformed into digital signal levels by a transformer which then serves as the input to a clock recovery circuit separating the DS1 signal into a data stream and clock pair. The dam and clock pair at the DS1 data transmission rate are input to an 8-bit buffer. The buffers are to allow for the time base change from the DS1 data rate to the DS2 data rate in a multiplexer. The multiplexer takes the data from each of the four buffers and multiplexes them into a single channel of data output through a buffer amplifier to the QPR modulator. The clock for the DS2 format dam is derived from an oscillator which drives the multiplexer.

Each of the buffers are enabled to transmit dam to the multiplexer by indicating that they are almost full, which is termed a STUFF REQ. When this condition occurs, the buffers are enabled to transmit the data at the DS2 data rate until they are empty enough to allow the DS1 signals to fill them again.

The multiplexer comprises basically a 4:1 multiplexer which takes two of the DS1 channels in a non-inverted state and the other two in an inverted state and time division multiplexes them into a serial data signal which is then randomized by a PRBS randomizer. The randomized dam is then framed by a data framer, and finally resynchronized to the DS2 data rate by the DS2 clock.

Control for the buffers and the multiplexer are provided by a multiplexer control comprising counters and decoders. The multiplexer control further controls two multiplexers which provide the data and framing bits for the DS2 signaling overhead at the correct times and correct places in the signal.

Figure 8:
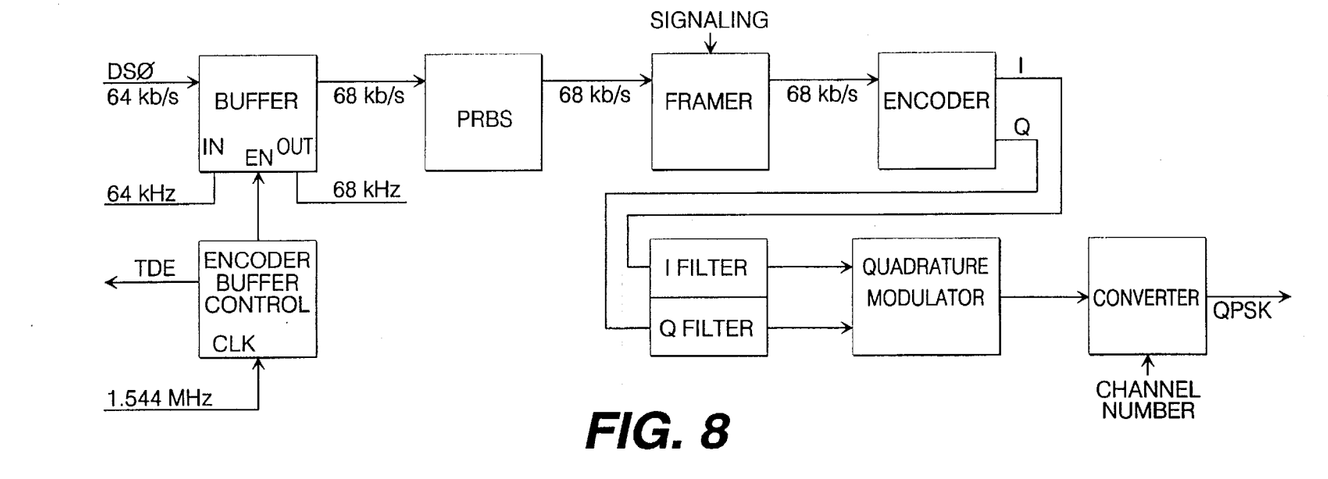
FIG. 8 is a detailed block diagram of a modulator for telephony terminal illustrated in FIG. 6.

A more detailed schematic diagram of the modulator 94 for each terminal is illustrated in FIG. 8. The modulator functions to change the data rate from the 64 kb/s voice signal at the line card to 68 kb/s, thereby allowing framing bytes to be added to the signal. The modulator also combines the data with a psuedorandom bit sequence (PRBS), which randomizes the data for transmission over their CTV network. The signal is the QPSK modulated on a carrier using differential encoding.

Referring now to the figure, the voice data, after being digitally encoded, is shifted into a three stage buffer at 64 kb/s and shifted out of the buffer at 68 kb/s. This allows an extra byte to be added to the data stream at 16 byte intervals to produce a subframe of 17 bytes. The specialized byte or framing byte is used for signaling, frame recognition, error detection and correction, or the like.

When the data stream has been increased in frequency, a randomizer acts on the data to distribute the energy of the signal over longer time periods. It is known that such randomization is beneficial for the clock recovery circuits of the demodulators at the central or headend location. The randomization is accomplished by generating a string of psuedorandom bits, a PRBS, and then adding it byte by byte to the data signal. The longer and more random the string, the more randomizing effect that such operation has on the dam. The PRBS can be generated in many ways, but the simplest is with a shift register which continually recirculates the sequence wherein the preferred implementation a 127 bit pattern is used. The output, as is well known, can be derandomized by subtracting the same sequence in the same order which it was added to the bit stream.

The signal is then framed in a framer which inserts the special framing bytes every 16 data bytes. The framing format is similar to the European E-1 format where bytes are added to a data signal in even and odd frame times. Two reasons for this is because the DS0 format is already byte oriented, and bunched framing sequences are easier to frame on the nonbunched sequences.

Figure 9:
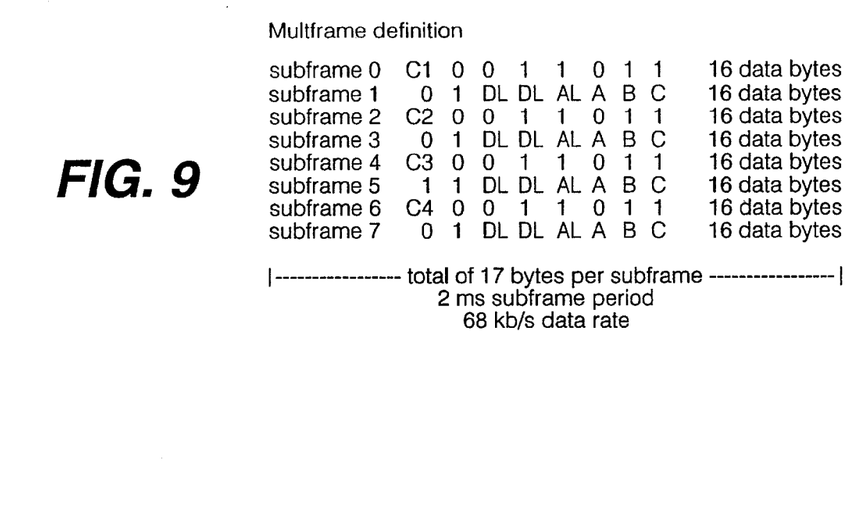
FIG. 9 is a pictorial representation of the framing protocol of the modulator illustrated in FIG. 8.

The illustrated framing sequence for the preferred embodiment is shown in FIG. 9, where the framing is organized as even and odd subframes of 17 bytes and where there are different FAS bytes for each. The subframes are grouped into a multiples of 8 in a multiframe to allow for higher level activities such as CRC computation. The framing sequence is x0011011 in the even subframes, and x1xxxxxx in the odd subframes. The don't care (x) bits may be used for special conditions but are not important for framing. The framing patterns use both the primary and secondary FAS values to insure no false framing locations appear in the data. The primary FAS must have 7 bits to match while the secondary FAS has only one bit, but it is in a location where the primary has a zero. If the primary pattern is encountered in the dam, then the chances of a data one being encountered simultaneously in the secondary FAS are low.

The framer can be operated in two modes, one with a cyclic redundancy code (CRC) and one without a CRC. If the first bit in each of the FAS bytes is always one, then a CRC is not used and there are only two subframes (no multiframe). If the first bit in the odd subframes is the pattern shown in FIG. 9, then the CRC multiframe is recognized. The definition of the multiframe allows carrying of a CRC remainder in the first bit of the FAS in the even subframes. The bits C1, C2, C3 and C4 will carry a CRC-4 remainder for the previous frame. The CRC computation is $X^4+X+1$ which is defined by the CCITT G.704 for use with the E1 telephony format. The CRC computation will indicate the quality of the data transmission. This framing format allows for alternate use of each channel as a data transmission channel. Any 64 kb/s data stream can be transmitted (data or voice), which will allow for support of DDS type services.

The DL bits form a 500 bits per second data link. The data link will use an HDLC level formatter to send message packets or bit oriented status information. The AL bit is an Alarm bit which indicates a problem at the line card. A data bit 1 no Alarm, and a data bit 0 Alarm. The bits A, B, C and D are the signaling bits which provide for sixteen possible signaling states. It is evident that more states can be defined by toggling the bits at certain rates. The signaling bit definitions are: bit A=1 on hook; bit A=0 off hook; bit B=1 not ringing; and bit B=0 ringing. The status of the appropriate status detector will be read once every 4 ms and inserted into the proper bit locations in the odd FAS.

The RF modulator accepts a 68 kb/s data stream to QPSK modulate a RF carder (5 MHz to 30 MHz) and transmits the information via the coaxial cable subnetwork in a 50 kHz channel to the headend. The digital data is split into I and Q channels by the encoder and differentially encoded to remove phase ambiguity in the carrier recovery at the receiving end. The I and Q channels of encoded information are then filtered separately in filters to ensure that the data can be transmitted with a minimum of intersymbol interference. The filters are digitally implemented and approximate a raised cosine filter with an alpha=1.5. Separate filtering at baseband allows for lowpass filters to be used instead of a more complex bandpass at the output of the modulator.

The I and Q signals are then amplified to appropriate levels in order to assure proper operation of the mixers. The modulator generates two phase locked IF carriers, 90° out of phase, each of which are PSK modulated with one channel of the encoded and filtered data.

The two channels are recombined to produce a quadrature signal and amplified prior to being frequency translated to the appropriate transmit channel. The translation operation is frequency agile, and the transmit channel is programmable through the forward data link. The transmit signal is then amplified by a buffer amplifier, thus permitting a fully loaded system with 480 channels to produce approximately the same loading as would 5 video channels in the reverse band.

Figure 10:
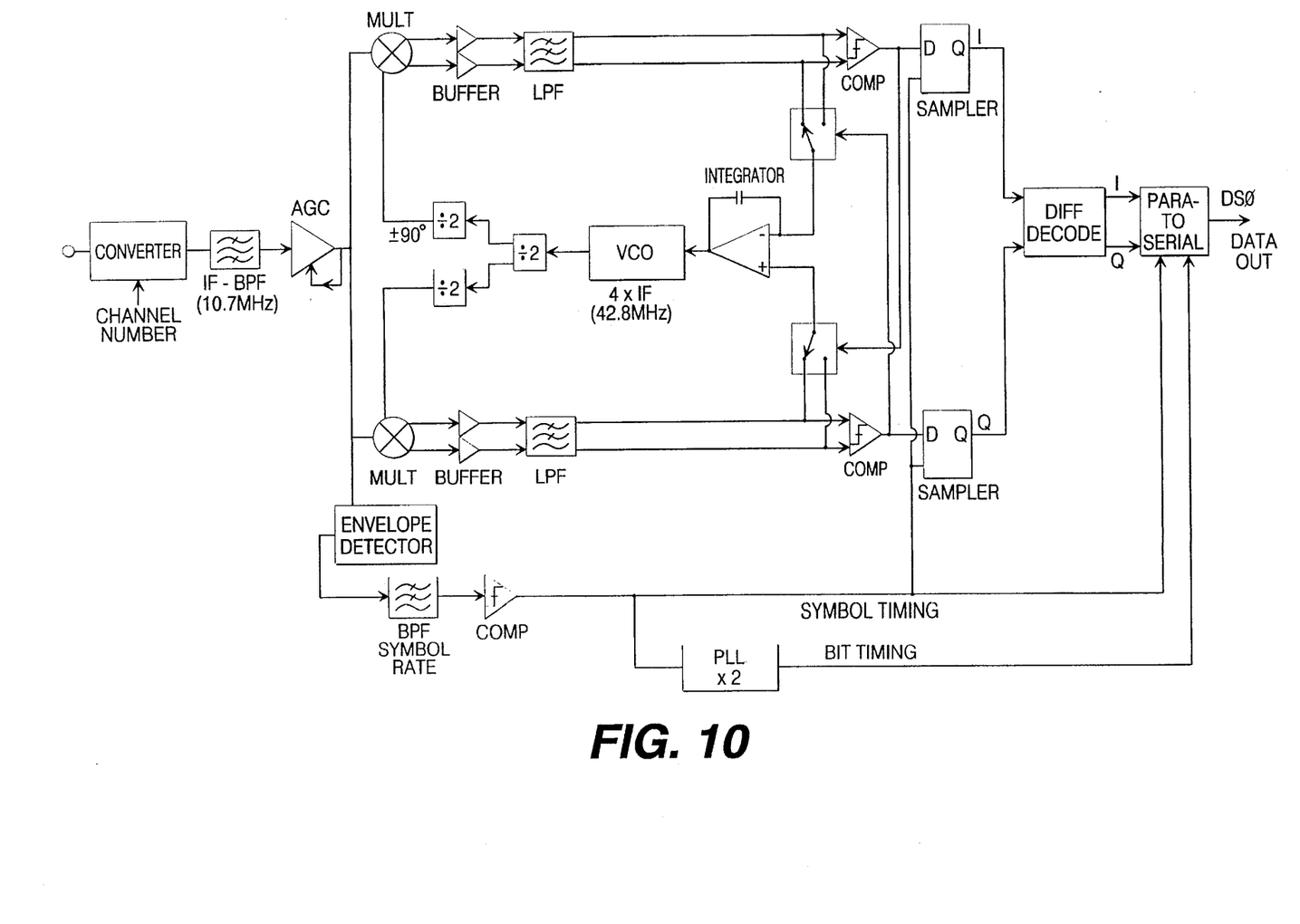
FIG. 10 is a detailed block diagram of the demodulator of the tuner/demodulator of the output interface illustrated in FIG. 6.

The demodulator for the QPSK signal, which is 50 kHZ in bandwidth, will be more fully described with reference to FIG. 10. The particular carrier frequency in which the QPSK signal is modulated is tuned by a converter having as an input the channel number from the authorization and data controller. The converter selects the particular frequency and converts it to an intermediate frequency, preferably 455 kHZ. The intermediate frequency signal is faltered by a band pass filter and them amplified by an amplifier with automatic gain control. The clock for the QPSK signal is recovered through an envelope detector and a band pass filter which passes the symbol rate, in this case 32 kHZ to a comparator. This clock is used to clock two D-type bistables which sample the I and Q phases of the QPSK signal. The samples of the I and Q phases are differentially decoded and then converted from parallel to serial in converter and thereafter output as a 64 kb/s digital signal.

The demodulation takes place in a two path demodulator which multiplies each phase of this signal by a recovered carrier from a VCO. The VCO is nominally at four times the symbol rate and is divided into an in-phase path and a quadrature phase path. One phase of the carrier signal is applied to a multiplier which produces a demodulated signal and its inverse, which are then filtered by a low pass filter and differentially compared by a comparator to become the input to the D-type bistable. The other phase of the carrier is applied to a multiplier which demodulates the intermediate frequency signal by the recovered carder and, then low pass filters the result and applies it to a comparator. The output of the comparator becomes the input to the D-type bistable where it can be sampled at the symbol time to decode the value of the bit.

The carrier is recovered by driving the voltage control oscillator from the output of an integrator which differentially compares the phases of each of the demodulated signals and their inverses through multiplexers. The multiplexer inputs are selectively controlled from the values of the signal channel and inverse outputs.

In summary, the present invention provides for broadband communications including digital communications, telephony, and telephony-related services by utilizing a CTV system in an efficient manner, while not requiring extensive switching equipment and a redesign of such systems. The broadband communications system requires no switching in the normal context when connecting telephony based calls from a subscriber or to a subscriber. A multiplicity of calls can be placed through the system efficiently using the broad bandwidth of the CTV network to utilize its best features and having the switching for the connection of the calls perforated by the telephony network to utilize its best features.

There are two types of telephony calls in the broadband communications system, where one is an incoming call and the other is a outgoing call. With combinations of these types of calls, all the necessary connections to or from another telephony set and to or from a CTV network subscriber can be made. The subscriber may call (or be called by) another subscriber within the CTV network system, may call (or be called by) a local telephone set within the local area of the telephone network, or may call (or be called by) the telephone network to interface to the long distance and international telephony systems.

An incoming call is directed to a particular subscriber of the CTV network by the telephony network recognizing that the call is directed to one of the group of subscribers belonging to the CTV network. The call is then switched by the telephony network to the OC-1 or other standard telephony signal coupled to the CTV network in the time slot assigned to that subscriber. The addressing and control system of the CTV network then decodes the multiplexed information and translates it into a frequency and time position in the forward multiplex that has been assigned to the particular subscriber. The addressing and control system further provides the necessary control for causing the subscriber equipment to ring or alert the subscriber of an incoming call.

The telephony network and CTV network maintain the connection until there is an indication of an "on hook" signal by one of the parties or another signal that indicates that the communication is complete, such as an end of message data pattern or the like. What is meant by maintaining the connection is that the telephony network continues to place the called party's data packets into the assigned DS0 position in the standard telephony signal and the broadband communications system continues to convert them to the location and frequency in the forward multiplex that is directed to the particular subscriber.

For outgoing calls, the telephony network recognizes from the DS0 position in the standard telephony signal which data packet belongs to a particular originating subscriber of the CTV network. This is an assigned position and the CTV system converts data on whatever carrier frequency is input to the demodulators to that assigned position in the reverse multiplex. Therefore, for outgoing calls the telephony network will consider the standard telephony signal as a group of individual DS0 signals, whose location in the reverse multiplex identifies the originating subscriber.

While there has been shown and described the preferred embodiments of the invention, it will be evident to those skilled in the art that various modifications and changes may be made thereto without departing from the spirit and scope of the invention as set forth in the appended claims and equivalents thereof.

What is claimed is:

1. An apparatus for the communications of incoming telephony signals from a telephony network to a plurality of subscribers of a subscription system and for the communication of outgoing telephony signals from the plurality of subscribers to the telephony network, said subscription system including a subscription network having a forward band of frequencies and a reverse band of signaling frequencies, said apparatus comprising:

a first modulator for modulating the incoming telephony signals from the telephony network on a carrier in the forward band of said subscription network;

a subscriber terminal demodulator for demodulating the incoming telephony signals from the selected one of the plurality of subscribers;

a second modulator for modulating the outgoing telephony signals from the selected one of the plurality of subscribers on a carrier in the reverse band of the subscription network;

an outgoing telephony signal demodulator for demodulating the outgoing telephony signals from the reverse band of the subscription network; and a first coupler for coupling the incoming and outgoing telephony signals with the telephony network;

wherein said incoming and outgoing telephony signals are selected from the group including SONET, OC-1, DS3, DS2, DS1 and E-1;

wherein said first coupler comprises a first demultiplexor for demultiplexing and decoding each of said incoming telephony signals into groups of telephony signals;

wherein said first modulator modulates each group onto a separate group carrier which is frequency division multiplexed in the forward band of the subscription network;

wherein said subscriber terminal demodulator includes:
      a tuner for tuning at least one group carrier and demodulating said groups of telephony signals;
      a second demultiplexor, coupled to said tuner, for demultiplexing said groups of telephony signals into individual subscriber telephone signals;
      a selecting element, coupled to said second demultiplexor, for selecting the individual subscriber telephony signal addressed to the subscriber, and
      a second coupler for coupling said individual subscriber telephony signal to a subscriber line and which is coupled to the telephone equipment of the subscriber.

2. An apparatus for the communication of incoming telephony signals from a telephony network to a plurality of subscribers of a subscription system and for the communication of outgoing telephony signals from the plurality of subscribers to the telephony network, said subscription system including a subscription network having a forward band of frequencies and a reverse band of signaling frequencies, said apparatus comprising:

first means for modulating the incoming telephony signals from the telephony network on a carrier in the forward band of said subscription network;

subscriber terminal means for demodulating the incoming telephony signals from the subscription network and coupling them to a particular one of the plurality of subscribers;

second means for modulating the outgoing telephony signals from the particular one of the plurality of subscribers on a subscriber telephony carrier in the reverse band of the subscription network;

means for demodulating the outgoing telephony signals from the reverse band of the subscription network; and means for coupling the incoming and outgoing telephony signals with the telephony network;

wherein said subscriber terminal means further includes means for coupling the subscriber telephone equipment to said subscriber terminal means;

wherein said coupling means includes means for digitizing the telephony signals from the subscriber;

wherein said digitizing means includes means for digitizing the telephony from the subscriber and combining them with digitized control and addressing information;

wherein said digitized telephony signals from the subscriber are in DS0 format;

wherein said second means for modulating modulates said subscriber telephony carrier with a QPSK modulation having a bandwidth of approximately 50 kHz;

wherein said means for demodulating the telephony signals from the reverse band includes:

a plurality of demodulators, each for tuning and demodulating a subscriber telephony carrier of the reverse band of the subscriber network and generating a plurality of demodulated subscriber telephony signals; and means for multiplexing the subscriber telephony signals of the subscriber network into a combined telephony signal, wherein said combined telephony signal is in one of OC-1, DS1, DS2, DS3, and E-1 format.

3. An apparatus for the communication of incoming telephony signals from a telephony network to a plurality of subscribers of a subscription system and for the communication of outgoing telephony signals from the plurality of subscribers to the telephony network, said subscription system including a subscription network having a forward band of frequencies and a reverse band of signaling frequencies, said apparatus comprising:

a first modulator for modulating the incoming telephony signals from the telephony network on a carrier in the forward band of said subscription network, said incoming telephony signals from the telephony network comprising a digital multiplexed input signal including a plurality of input data channels, the position of a particular input data channel in the multiplexed input signal indicating the destination of the data in that channel to the particular one of the plurality of subscribers;

a subscriber terminal demodulater for demodulating the incoming telephony signals from the subscription network and coupling them to a particular one of the plurality of subscribers;

a second modulator, associated with said subscriber terminal demodulater, for modulating the outgoing telephony signals from the particular one of the plurality of subscribers on a carrier in the reverse band of the subscription network, said outgoing telephony signals to the telephony network comprising a digital multiplexed output signal including a plurality of output data channels, the position of a particular output data channel in the multiplexed output signal indicating the origin of the data in that channel from the particular one of the plurality of subscribers;

an outgoing telephony signal demodulator for demodulating the outgoing telephony signals from the reverse band of the subscription network;

a first coupler for coupling the incoming telephony signals from the telephony network to said first modulator, said first coupler coupling the particular input data channel to a predetermined carrier in the forward band of the subscription network; and a second coupler for coupling the outgoing telephony signals from said outgoing telephony signal demodulator to the telephony network, said second coupler coupling the outgoing telephony signals from the particular one of the plurality of subscribers in the reverse band of the subscription network to the particular output data channel.

4. The apparatus as set forth in claim 3 wherein said incoming and outgoing telephony signals are selected from the group including SONET, OC-1, DS3, DS2, DS1 and E-1.

5. The apparatus as set forth in claim 4 wherein said first coupler comprises:

a demultiplexor for demultiplexing and decoding each of said incoming telephony signals into groups of telephony signals;

said first modulator modulating each group onto a separate carrier which is frequency division multiplexed in the forward band of the subscription network.

6. The apparatus as set forth in claim 5 wherein said first modulator modulates each group carrier with a QPR modulation.

7. The apparatus as set forth in claim 6 wherein said subscription network carries a plurality of frequency division multiplexed subscription channels with a guard band on each side of a subscription channel; and wherein said first modulator frequency division multiplexes said forward telephony channels with said subscription channels.

8. The apparatus as set forth in claim 7 wherein said first modulator frequency division multiplexes at least one of said forward band telephony channels in the guard bands between two adjacent subscription channels.

9. The apparatus as set forth in claim 7 wherein said first modulator frequency division multiplexes said forward telephony channels in portions of the forward band unused by the subscription channels.

10. The apparatus as set forth in claim 7 wherein said first modulator frequency division multiplexes at least two of the forward telephony channels into adjacent locations in the forward band.

11. The apparatus as set forth in claim 5 wherein said subscriber terminal demodulator includes:

a tuner for tuning at least one group carrier and demodulating said groups of telephony signals;

a second demultiplexor, coupled to said tuner, for demultiplexing said groups of telephony signals into individual subscriber telephone signals; and a selector, coupled to said second demultiplexor, for selecting the individual subscriber telephony signal addressed to the subscriber.

12. The apparatus as set forth in claim 11 wherein said subscriber terminal demodulator further includes:

a third coupler for coupling said selected individual subscriber telephony signal to a subscriber line which is coupled to the telephone equipment of the subscriber.

13. The apparatus as set forth in claim 3 wherein said first modulator modulates the incoming telephony signals from the telephony network by a QPR modulation; and wherein said second modulator modulates the outgoing telephony signals from the particular one of the plurality of subscribers by a QPSK modulation.

14. The apparatus as set forth in claim 3 wherein said subscriber terminal demodulator further includes a fourth coupler for coupling the telephone equipment to said subscriber terminal demodulator.

15. The apparatus as set forth in claim 14 wherein said fourth coupler includes a digitizer, coupled to the subscriber telephone equipment, for digitizing the telephony signal from the subscriber.

16. The apparatus as set forth in claim 15 further comprising a combiner, coupled to the digitizer, for combining the digitized telephony signal from the subscriber with digitized control and addressing information.

17. The apparatus as set forth in claim 16 wherein said digitized telephony signals from the subscriber are in DS0 format.

18. The apparatus as set forth in claim 3 wherein said second modulator modulates a separate carrier from the subscriber terminal which is frequency division multiplexed with other subscriber telephony carriers in the reverse band of the subscription network.

19. The apparatus as set forth in claim 18 wherein said second modulator modulates each subscriber telephony carrier with a QPSK modulation.

20. The apparatus as set forth in claim 19 wherein said second demodulator includes a plurality of demodulators, each for tuning and demodulating a subscriber telephony carrier of the reverse band of the subscription network into a combined telephony signal.

21. The apparatus as set forth in claim 20 wherein said second demodulator further includes a second demultiplexor for demultiplexing the subscriber telephony signals of the subscription network into a combined telephony signal.

22. The apparatus as set forth in claim 21 wherein said combined digital telephony signal is in one of OC-1, DS1, DS2, DS3 and E-1 format.

23. An apparatus for the communication of incoming telephony signals from a telephony network to a plurality of subscribers of a subscription system and for the communication of outgoing telephony signals from the plurality of subscribers to the telephony network, said subscription system including a subscription network having a forward band of frequencies and a reverse band of signaling frequencies, said apparatus comprising:

a first modulator for modulating the incoming telephony signals from the telephony network on a carrier in the forward band of said subscription network;

a subscriber terminal demodulator for demodulating the incoming telephony signals from the subscription network and coupling them to a particular one of the plurality of subscribers;

a second modulator, associated with said subscriber terminal element, for modulating the outgoing telephony signals from the particular one of the plurality of subscribers on a carrier in the reverse band of the subscription network;

an outgoing telephony signal demodulator for demodulating the outgoing telephony signals from the reverse band of the subscription network;

a first coupler for coupling the incoming telephony signals from the telephony network to said first modulator; and a second coupler for coupling the outgoing telephony signals from said outgoing telephony signal demodulator to the telephony network;

said incoming and outgoing telephony signals being selected from the group including SONET, OC-1, DS3, DS2 and E-1;

said first coupler comprising a demultiplexor for demultiplexing and decoding said incoming telephony signals into groups of telephony signals;

said first modulator modulating each group onto a separate carrier which is frequency division multiplexed in the forward band of the subscription network as forward telephony channels;

said first modulator modulating each group carrier with QPR modulation having a bandwidth of approximately 3 MHz;

said subscription network carrying a plurality of frequency division multiplexed 4.5 MHz subscription channels with a 1.5 MHz guard band on each side of a subscription channel;

said first modulator frequency division multiplexing said forward telephony channels with the subscription channels; and said first modulator frequency division multiplexing at least one of said forward band telephony channels in the guard bands between two adjacent subscription channels.

24. An apparatus for the communication of incoming telephony signals from a telephony network to a plurality of subscribers of a subscription system and for the communication of outgoing telephony signals from the plurality of subscribers to the telephony network, said subscription system including a subscription network having a forward band of frequencies and a reverse band of signaling frequencies, said apparatus comprising:

a first modulator for modulating the incoming telephony signals from the telephony network on a carrier in the forward band of said subscription network;

a subscriber terminal demodulator for demodulating the incoming telephony signals from the subscription network and coupling them to a particular one of the plurality of subscribers;

a second modulator, associated with said subscriber terminal element, for modulating the outgoing telephony signals from the particular one of the plurality of subscribers on a carrier in the reverse band of the subscription network;

an outgoing telephony signal demodulator for demodulating the outgoing telephony signals from the reverse band of the subscription network;

a first coupler for coupling the incoming telephony signals from the telephony network to said first modulator; and a second coupler for coupling the outgoing telephony signals from said outgoing telephony signal demodulator to the telephony network;

said incoming and outgoing telephony signals being selected from the group including SONET, OC-1, DS3, DS2 and E-1;

said first coupler comprising a demultiplexor for demultiplexing and decoding said incoming telephony signals into groups of telephony signals;

said first modulator modulating each group onto a separate carrier which is frequency division multiplexed in the forward band of the subscription network as forward telephony channels;

said first modulator modulating each group carrier with QPR modulation having a bandwidth of approximately 3 MHz;

said subscription network carrying a plurality of frequency division multiplexed 4.5 MHz subscription channels with a 1.5 MHz guard band on each side of a subscription channel;

said first modulator frequency division multiplexing said forward telephony channels with the subscription channels; and said first modulator frequency division multiplexing said forward telephony channels in portions of the forward band unused by the subscription channels.

25. An apparatus for the communication of incoming telephony signals from a telephony network to a plurality of subscribers of a subscription system and for the communication of outgoing telephony signals from the plurality of subscribers to the telephony network, said subscription system including a subscription network having a forward band of frequencies and a reverse band of signaling frequencies, said apparatus comprising:

a first modulator for modulating the incoming telephony signals from the telephony network on a carrier in the forward band of said subscription network;

a subscriber terminal demodulator for demodulating the incoming telephony signals from the subscription network and coupling them to a particular one of the plurality of subscribers;

a second modulator, associated with said subscriber terminal element, for modulating the outgoing telephony signals from the particular one of the plurality of subscribers on a carrier in the reverse band of the subscription network;

an outgoing telephony signal demodulator for demodulating the outgoing telephony signals from the reverse band of the subscription network;

a first coupler for coupling the incoming telephony signals from the telephony network to said first modulator; and a second coupler for coupling the outgoing telephony signals from said outgoing telephony signal demodulator to the telephony network;

said incoming and outgoing telephony signals being selected from the group including SONET, OC-1, DS3, DS2 and E-1;

said first coupler comprising a demultiplexor for demultiplexing and decoding said incoming telephony signals into groups of telephony signals;

said first modulator modulating each group onto a separate carrier which is frequency division multiplexed in the forward band of the subscription network as forward telephony channels;

said first modulator modulating each group carrier with QPR modulation having a bandwidth of approximately 3 MHz;

said subscription network carrying a plurality of frequency division multiplexed 4.5 MHz subscription channels with a 1.5 MHz guard band on each side of a subscription channel;

said first modulator frequency division multiplexing said forward telephony channels with the subscription channels; and said first modulator frequency division multiplexing at least two of the forward band telephony channels into adjacent locations in the forward band.

26. An apparatus for the communication of incoming telephony signals from a telephony network to a plurality of subscribers of a subscription system and for the communication of outgoing telephony signals from the plurality of subscribers to the telephony network, said subscription system including a subscription network having a forward band of frequencies and a reverse band of signaling frequencies, said apparatus comprising:

a first modulator for modulating the incoming telephony signals from the telephony network on a carrier in the forward band of said subscription network;

a subscriber terminal demodulator for demodulating the incoming telephony signals from the subscription network and coupling them to a particular one of the plurality of subscribers;

a second modulator, associated with said subscriber terminal element, for modulating the outgoing telephony signals from the particular one of the plurality of subscribers on a carrier in the reverse band of the subscription network;

an outgoing telephony signal demodulator for demodulating the outgoing telephony signals from the reverse band of the subscription network;

a first coupler for coupling the incoming telephony signals from the telephony network to said first modulator; and a second coupler for coupling the outgoing telephony signals from said outgoing telephony signal demodulator to the telephony network;

said incoming and outgoing telephony signals being selected from the group including SONET, OC-1, DS3, DS2 and E-1;

said first coupler comprising a first demultiplexor for demultiplexing and decoding said incoming telephony signals into groups of telephony signals;

said first modulator modulating each group onto a separate carrier which is frequency division multiplexed in the forward band of the subscription network as forward telephony channels;

said subscriber terminal demodulator including:

a tuner for tuning at least one group carrier and demodulating said groups of telephony signals;

a second demultiplexor, coupled to said tuner, for demultiplexing said groups of telephony signals into individual subscriber telephone signals; and a selector, coupled to said second demultiplexor, for selecting the individual subscriber telephony signal addressed to the subscriber.

27. The apparatus as set forth in claim 7 wherein said subscriber terminal demodulator further includes:

a third coupler for coupling said selected individual subscriber telephony signal to a subscriber line which is coupled to the telephone equipment of the subscriber.

28. An apparatus for the communication of incoming telephony signals from a telephony network to a plurality of subscribers of a subscription system and for the communication of outgoing telephony signals from the plurality of subscribers to the telephony network, said subscription system including a subscription network having a forward band of frequencies and a reverse band of signaling frequencies, said subscription network carrying a plurality of frequency division multiplexed subscription channels, said apparatus comprising:

a first modulator for modulating the incoming telephony signals from the telephony network on a carrier in the forward band of said subscription network, said first modulator modulating a group of incoming telephony signals with QPR modulation onto a separate carrier which is frequency division multiplexed in the forward band of the subscription network with said subscription channels;

a subscriber terminal demodulator for demodulating the incoming telephony signals from the subscription network and coupling them to a particular one of the plurality of subscribers;

a second modulator, associated with said subscriber terminal demodulator, for modulating the outgoing telephony signals from the particular one of the plurality of subscribers on a carrier in the reverse band of the subscription network;

an outgoing telephony signal demodulator for demodulating the outgoing telephony signals from the reverse band of the subscription network;

a first coupler for coupling the incoming telephony signals from the telephony network to said first modulator; and a second coupler for coupling the outgoing telephony signals from said outgoing telephony signal demodulator to the telephony network.

29. The apparatus as set forth in claim 28 wherein said incoming and outgoing telephony signals are selected from the group including SONET, OC-1, DS3, DS2 and E-1.

30. The apparatus as set forth in claim 29 wherein said first coupling element comprises a demultiplexor for demultiplexing and decoding each of said incoming telephony signals into groups of telephony signals 31. The apparatus as set forth in claim 30 wherein said first modulator modulates each group carrier with a QPR modulation.

32. The apparatus as set forth in claim 31 wherein said first modulator frequency division multiplexes at least one of said forward band telephony channels in the guard bands between two adjacent subscription channels.

\* \* \* \* \*